US006295935B1

(12) United States Patent
Swann et al.

(10) Patent No.: US 6,295,935 B1
(45) Date of Patent: Oct. 2, 2001

(54) INITIATOR FOR AIR BAG INFLATOR

(75) Inventors: Timothy A. Swann, Mesa; Ahmad K. Al-Amin, Higley; Jess A. Cuevas, Scottsdale; Bryan W. Shirk; Roy D. Van Wynsberghe, both of Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/067,287

(22) Filed: Apr. 27, 1998

(51) Int. Cl.[7] ................................. F42B 3/10; C06D 5/00
(52) U.S. Cl. ................ 102/530; 102/202.7; 102/202.14; 222/5; 280/737; 280/741
(58) Field of Search ............................. 102/202.5, 202.7, 102/202.8, 202.9, 202.11, 202.14, 530, 531; 222/5; 137/68.13; 280/737, 741

(56) References Cited

U.S. PATENT DOCUMENTS

| 3,082,691 | * | 3/1963 | Evans et al. ................. 102/202.14 |
| 3,191,533 | * | 6/1965 | Hopson, III ...................... 102/306 |
| 4,976,203 | * | 12/1990 | Weisshaupt et al. .............. 102/476 |
| 5,131,680 | | 7/1992 | Coultas et al. . |
| 5,226,561 | | 7/1993 | Hamilton et al. . |
| 5,230,531 | * | 7/1993 | Hamilton et al. .................. 280/737 |
| 5,263,740 | * | 11/1993 | Frey et al. ........................ 280/737 |
| 5,344,186 | * | 9/1994 | Bergerson et al. ................ 280/741 |
| 5,350,192 | * | 9/1994 | Blumenthal ...................... 280/737 |
| 5,536,040 | * | 7/1996 | Cuevas et al. .................... 280/737 |
| 5,558,367 | | 9/1996 | Cuevas . |
| 5,576,509 | * | 11/1996 | Refouvelet et al. ............. 102/202.7 |
| 5,601,308 | * | 2/1997 | Cuevas et al. .................... 280/737 |
| 5,603,525 | * | 2/1997 | Zakula .......................... 102/202.14 |
| 5,622,381 | | 4/1997 | Mossi et al. . |
| 5,678,856 | | 10/1997 | Headley . |

FOREIGN PATENT DOCUMENTS

| 586133 | * | 3/1994 | (EP) ............................. 102/202.7 |

* cited by examiner

Primary Examiner—Harold J. Tudor
(74) Attorney, Agent, or Firm—Tarolli, Sundheim, Covell, Tummino & Szabo L.L.P.

(57) ABSTRACT

An initiator (50) for rupturing a burst disk (36) in an air bag inflator (10) includes a body of ignitable material (112) for, when ignited, generating combustion products. A base (52) supports the body of ignitable material (112), and an electrically energizable member (80) for igniting the ignitable material, on the inflator (10). The initiator (50) also includes a cap (90) sealed to the base (52). The cap (90) encloses the ignitable material (112) and maintains the ignitable material in position on the base (52). At least a first portion (94) of the cap (90) is releasable from the base (52) under the force of the combustion products of the ignitable material (112) to enable movement of at least the first portion of the cap away from the base and into engagement with the burst disk (36) to rupture the burst disk.

5 Claims, 4 Drawing Sheets

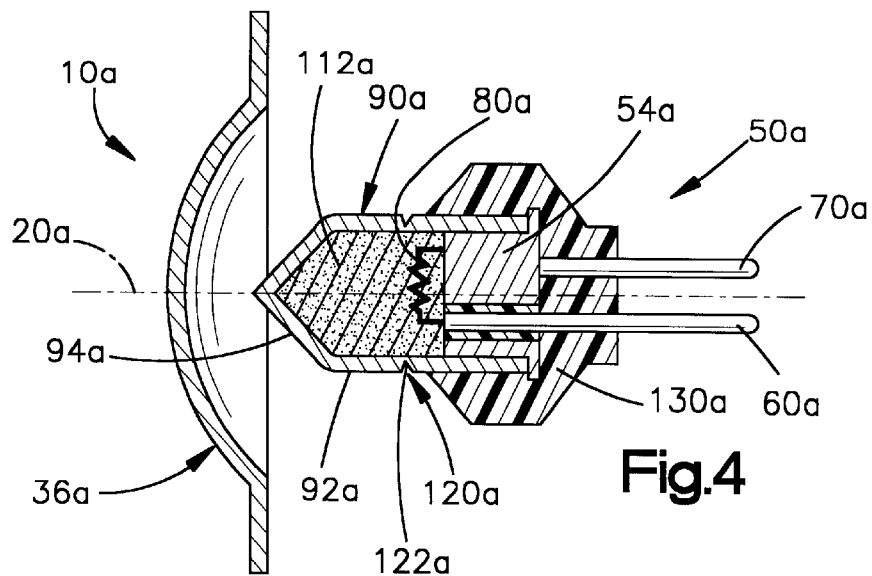
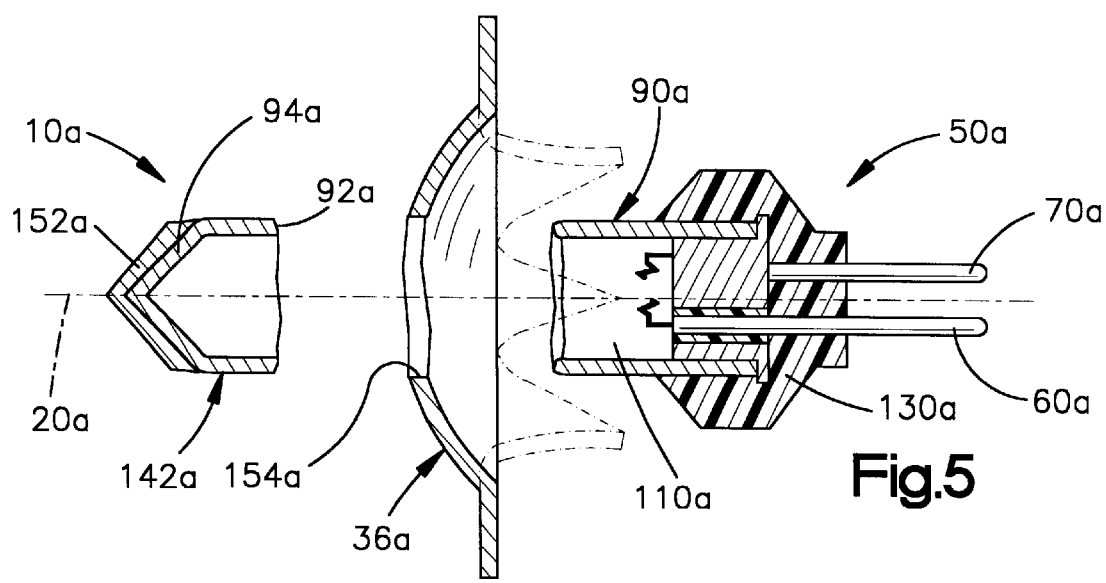

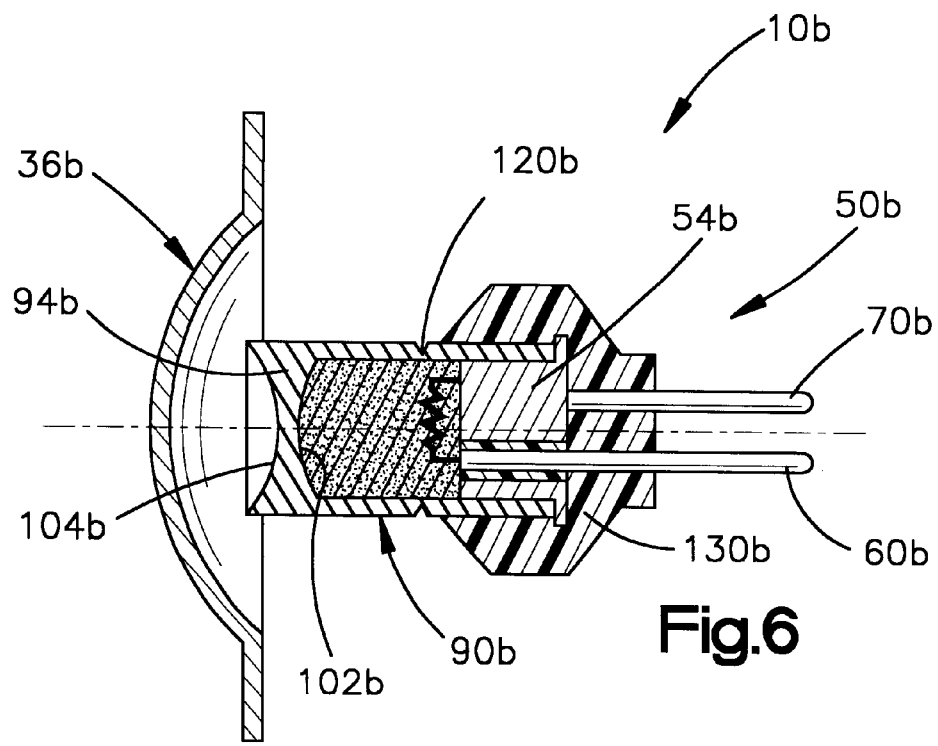
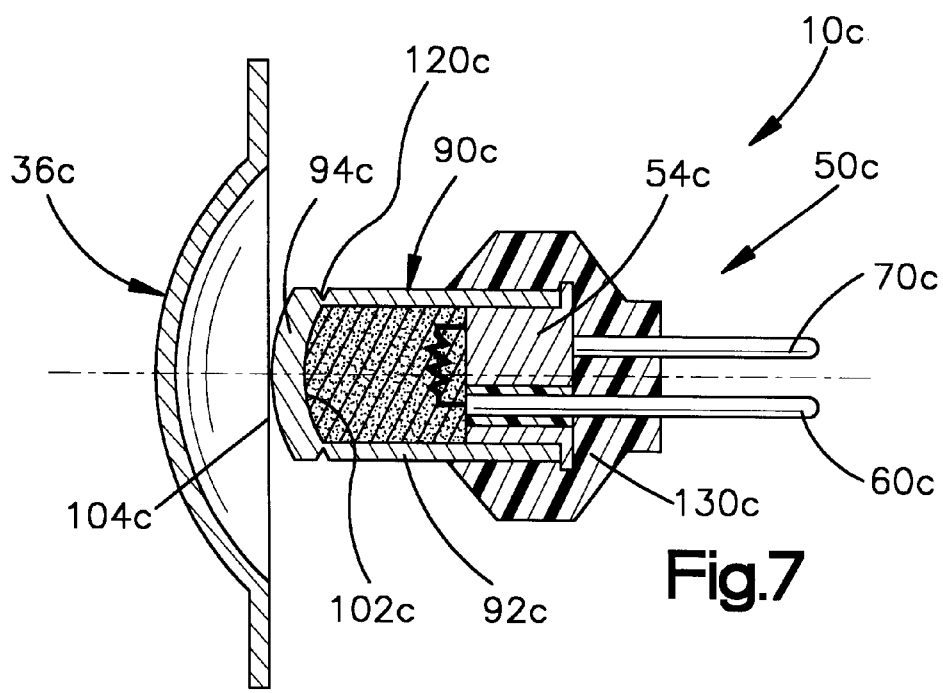

INITIATOR FOR AIR BAG INFLATOR

BACKGROUND OF THE INVENTION

1. Technical Field

The present invention relates to an apparatus for inflating an inflatable vehicle occupant protection device, such as an air bag. In particular, the present invention relates to an initiator for an air bag inflator having a burst disk which is opened by the initiator.

2. Description of the Prior Art

U.S. Pat. No. 5,622,381 describes an inflator for inflating an air bag. The inflator includes a squib having an outer body portion enclosing a pyrotechnic material. A projectile in the form of a metal sleeve, closed at one end, is snapped onto the outer body portion of the squib. Upon actuation of the squib, the outer end portion of the squib ruptures. The projectile is propelled from the squib into engagement with a burst disk to rupture the burst disk.

SUMMARY OF THE INVENTION

The present invention is an actuatable initiator for rupturing a burst disk in an air bag inflator to enable flow of inflation fluid out of the inflator to inflate an inflatable vehicle occupant protection device. The initiator comprises a body of ignitable material for, when ignited, generating combustion products; electrically energizable means for igniting the ignitable material; and a base for supporting the body of ignitable material and the means for igniting on the inflator. The initiator also comprises a cap sealed to the base. The cap encloses the ignitable material and maintains the ignitable material in position on the base. At least a first portion of the cap is releasable from the base under the force of the combustion products of the ignitable material to enable movement of at least the first portion of the cap away from the base and into engagement with the burst disk to rupture the burst disk.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a view similar to FIG. 2 of an initiator constructed in accordance with a second embodiment of the invention;

FIG. 5 is a view similar to FIG. 3 of the initiator of FIG. 4 shown in an actuated condition;

FIG. 6 is a view similar to FIG. 2 of an initiator constructed in accordance with a third embodiment of the invention; and FIG. 7 is a view similar to FIG. 2 of an initiator constructed in accordance with a fourth embodiment of the invention.

DESCRIPTION OF PREFERRED EMBODIMENTS

Figure 1:
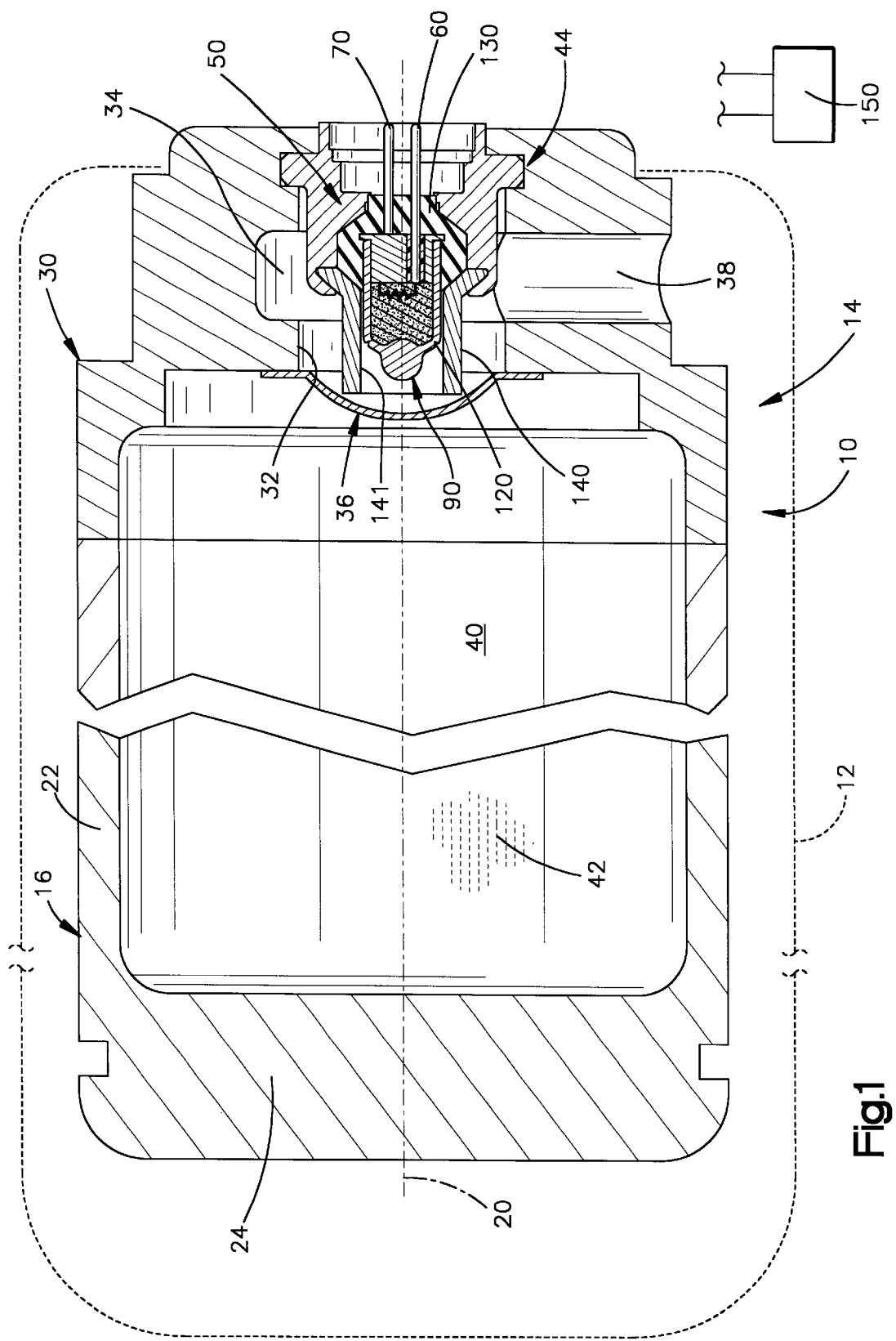
FIG. 1 is a longitudinal sectional view, partially broken away, of an inflator including a burst disk and an initiator constructed in accordance with the present invention.

The present invention relates to an apparatus for inflating an inflatable vehicle occupant protection device, such as an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. In particular, the present invention relates to an air bag inflator having a burst disk which is opened by an initiator. As representative of the present invention, FIG. 1 illustrates an inflator 10 for inflating an inflatable vehicle occupant protection device, or air bag, illustrated schematically at 12.

The inflator 10 includes a container 14. The container includes a cylindrical main body portion 16 which is centered on an axis 20 of the inflator 10. The main body portion 16 of the container 14 includes a cylindrical, axially extending side wall 22 and a radially extending end wall 24.

The container 14 includes a diffuser 30 welded to an open end of the main body portion 16 of the container opposite the end wall 24. The diffuser 30 defines an opening 32 into an initiator chamber 34. A rupturable burst disk 36 is welded to the diffuser 30 and extends across the opening 32 in the diffuser. A gas outlet opening 38 extends between the initiator chamber 34 and the exterior of the diffuser 30.

The container 14 defines a gas storage chamber 40. A quantity of inflation fluid 42 in the form of gas is stored under pressure in the chamber 40. The burst disk 36 blocks flow of the fluid 42 out of the chamber 40 through the opening 32. The inflator 10 could alternatively include structure different than the burst disk 36, such as a thin-walled portion of the diffuser 30.

Figure 2:
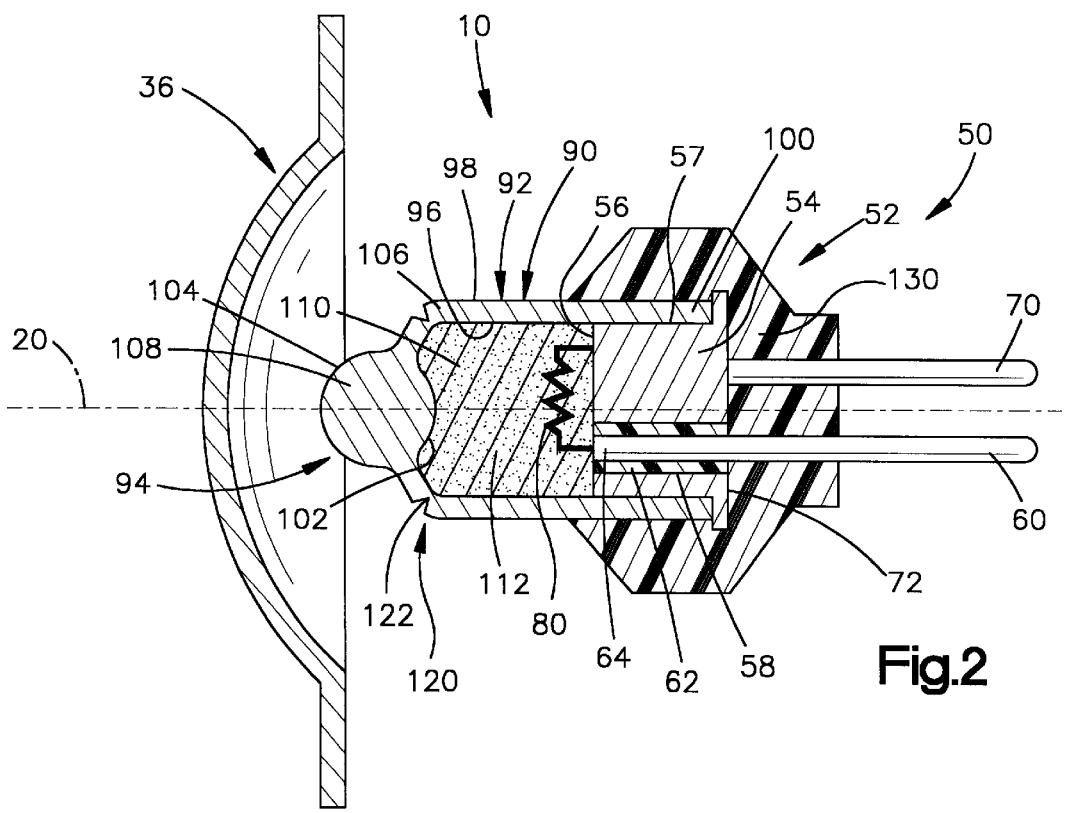
FIG. 2 is an enlarged view of the initiator of the inflator of FIG. 1, shown in an unactuated condition, together with the burst disk.

The inflator 10 includes a metal retainer 44 clamped in the diffuser 30. The retainer secures an initiator 50 in position in the inflator 10. The initiator 50 includes a base 52 (FIG. 2). The base 52 includes a cylindrical metal header 54 having a planar, radially extending inner end surface 56 and a cylindrical outer side surface 57.

The header 54 has an axially extending passage 58. A first electrical terminal 60 extends through the passage 58 in the header 54. An electrical insulator 62 in the passage 58 insulates between the first terminal 60 and the header 54. An inner end portion 64 of the first terminal 60 is exposed at the inner end surface 56 of the header 54. A second electrical terminal 70 is welded to an outer end surface 72 of the header 54.

A resistive element 80 extends between the inner end portion 64 of the first terminal 60 and the inner end surface 56 of the header 54. The resistive element 80 electrically interconnects the first terminal 60 and the header 54. Because the second terminal 70 is welded to the header 54, the resistive element 80 electrically interconnects the first and second terminals 60 and 70. The resistive element 80 is operative to generate heat when an electric current is passed through the resistive element between the first and second terminals 60 and 70 of the initiator 50.

The initiator 50 includes a metal can or cap 90. The cap 90 is a single layer of metal having a cup-shaped configuration including a cylindrical, axially extending side wall 92. The side wall 92 of the cap 90 is centered on the axis 20 and has parallel inner and outer side surfaces 96 and 98. The side wall 92 has an outer end portion 100 which forms an open outer end of the cap 90. The outer end portion 100 of the side wall 92 is sealed by welding to the radially outer side surface 57 of the header 54.

The side wall 92 of the cap 90 has an inner end portion 106 adjacent to a generally radially extending end wall 94 of the cap. The end wall 94 of the cap 90 has inner and outer side surfaces 102 and 104. The end wall 94 of the cap 90 has an enlarged central portion in the form of a ball or spherical portion 108.

The side wall 92 and end wall 94 of the cap 90 together define a chamber 110 in the cap. A quantity of ignitable material 112 is disposed in the chamber 110. The ignitable material 112 is preferably a known pyrotechnic material such as $BKNO_3$, in powder form, which ignites when exposed to the heat generated by the resistive element 80.

The cap 90 encloses the ignitable material 112 and maintains the ignitable material 112 in contact with the inner end surface 56 of the header 54 and with the resistive element 80. The powder 112 is in intimate contact with the inner side surface 96 of the side wall 92 of the cap 90. The powder 112 is also in intimate contact with the inner side surface 102 of the end wall 94 of the cap 90.

A stress riser 120 is formed in the cap 90. The stress riser 120 comprises a weakened portion of the cap 90 formed at a predetermined location on the cap. In the illustrated embodiment, the stress riser 120 comprises a groove 122 which extends circumferentially around the cap 90 between the end wall 94 of the cap and the inner end portion 106 of the side wall 92 of the cap.

The base 52 of the initiator 50 also includes a body of plastic material 130. The body of plastic material 130 is injection molded around the header 54, the outer end portion 100 of the cap side wall 92, and the electrical terminals 60 and 70. The body of plastic material 130 is clamped in the retainer 44, to secure the initiator 50 in position in the inflator 10.

A focusing sleeve 140 is optionally provided for the initiator 50. The focusing sleeve 140 is a generally cylindrical metal member which encircles the inner end portion 106 of the side wall 92 of the cap 90 and the end wall 94 of the cap. The focusing sleeve 140 is clamped in position by the retainer 44. The focusing sleeve 140 has an opening 141 through which the end wall 94 of the cap 90 is movable, in a manner described below.

The first and second electrical terminals 60 and 70 of the initiator are connected with vehicle electric circuitry indicated schematically at 150 including a power source, which is preferably a vehicle battery and/or a capacitor, and a normally open switch. The switch is part of a sensor which senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag 12 or other vehicle occupant protection device is desired to help protect an occupant of the vehicle.

When the sensor senses a collision-indicating condition at or above the predetermined threshold level, the switch closes and the initiator 50 is energized electrically. An electric current flows between the first and second terminals 60 and 70 of the initiator 50, through the resistive element 80. The resistive element 80 generates heat which ignites the ignitable material 112.

The ignition of the ignitable material 112 causes an increase in the pressure inside the cap 90. The pressure increase inside the cap 90 causes the cap to rupture at the stress riser 120. The connection between the end wall 94 of the cap 90 and the side wall 92 of the cap is thus broken.

A first portion 142 of the cap 90 is released from and moves away from a second portion 144 of the cap. Specifically, the end wall 94 of the cap 90 is released from the side wall 92 and, under the force of the combustion products of the ignitable material 112, is propelled away from the base 52 in a direction toward the burst disk 36. The focusing sleeve 140 helps to direct the first portion 142 of the cap 90 to move in the desired direction, that is, toward the center of the burst disk 36.

Figure 3:
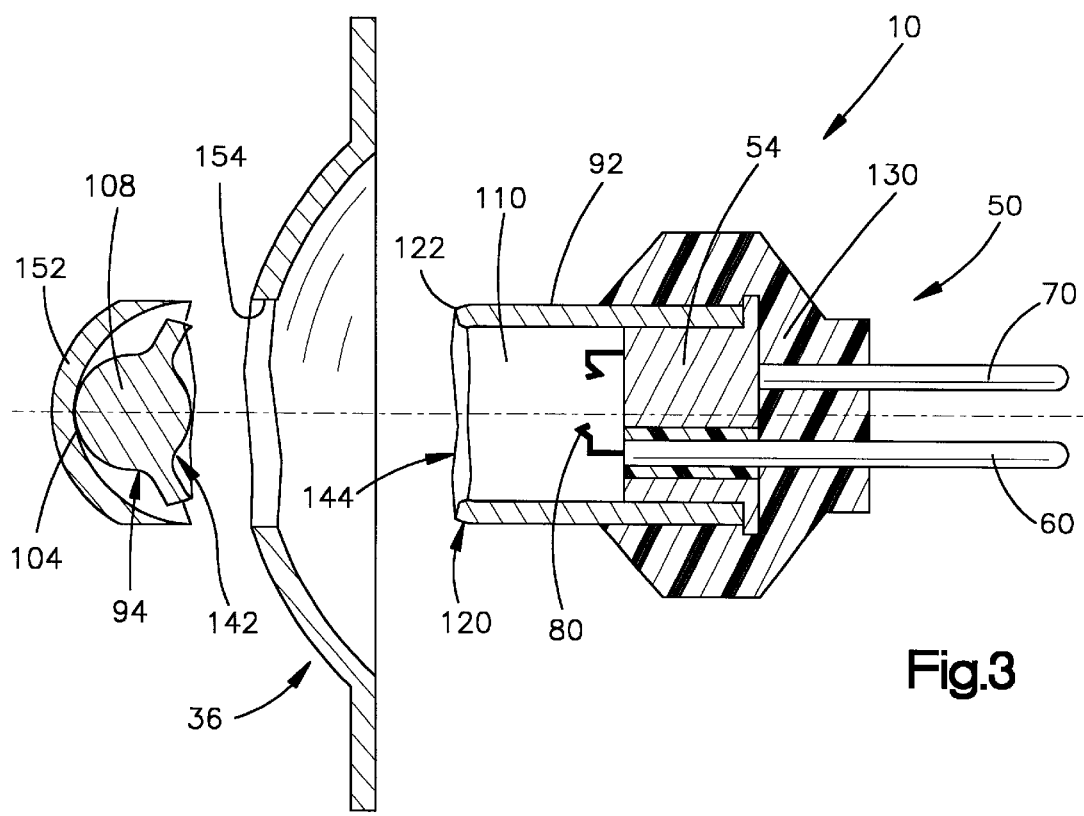
FIG. 3 is a view similar to FIG. 2 showing the initiator in an actuated condition.

The outer side surface 104 of the end wall 94 of the cap engages the burst disk 36. The moving first portion 142 of the cap 90 removes and carries away a central portion 152 of the burst disk 36. Because the central portion 108 of the cap 90 is spherical in configuration, it makes a uniform, circular opening 154 in the burst disk 36, centered on the axis 20. As a result, the burst disk 36 remains uniformly stressed and remains in the dome-shaped configuration illustrated in FIG. 3, without collapsing or rupturing further. The inflation fluid 42 flows through the opening 154 in the burst disk 36 and through the gas outlet opening 38 in the diffuser 30 to inflate the air bag 12.

FIGS. 4–5 illustrate portions of an inflator 10a including an initiator 50a constructed in accordance with a second embodiment of the present invention. The initiator 50a is generally similar in construction to the initiator 50 of the inflator 10, and similar parts are given similar reference numerals with the suffix "a" added to distinguish them.

In the initiator 50a, the stress riser 120a is located near the axial center of the side wall 92a of the cap 90a, rather than at the inner end of the side wall. Thus, the first portion 142a of the cap 90a includes a substantial part of the side wall 92a of the cap in addition to the end wall 94a. Also, the end wall 94a of the cap has a conical configuration. The end wall 94a has a circular configuration at its outer periphery, and tapers to a point at its radial center.

When the initiator 50a is actuated, the side wall 92a of the cap 90a ruptures at the stress rise 120a. The first portion 142a of the cap 90a, including the end wall 94a and a part of the side wall 92a, is projected toward and into engagement with the burst disk 36a.

The first portion 142a of the cap 90a makes an opening 154a in the burst disk 36a, removing a central portion 152a of the burst disk. Because the central portion 108 of the cap 90 is not spherical in configuration, the opening 154a in the burst disk 36a is most likely non-circular and/or not centered on the axis 20a. When this occurs, the burst disk 36a is unevenly stressed and ruptures from the dome-shaped configuration illustrated in solid lines in FIG. 5 to the configuration shown in dash-dot lines in FIG. 5. The edges of the burst disk 36a, around the opening 154a, petal in a direction toward the initiator 50a as the inflation fluid 42a flows out of the inflator.

FIGS. 6 and 7 illustrate other alternative end wall configurations for the initiator cap. In FIG. 6, the cap end wall 94b has opposed, concave inner and outer side surfaces 102b and 104b. The end wall 94b, when it engages and cuts the burst disk 36b, removes a generally circular portion of the burst disk 36. In FIG. 7, the cap end wall 94c has a dome-shaped configuration including parallel, part-spherical inner and outer side surfaces 102c and 104c.

From the above description of the invention, those skilled in the art will perceive improvements, changes and modifications in the invention. Such improvements, changes and modifications within the skill of the art are intended to be covered by the appended claims.

Having described the invention, we claim:

1. An actuatable initiator for rupturing a burst disk in an inflator to enable flow of inflation fluid out of the inflator to inflate an inflatable vehicle occupant protection device, said initiator comprising:

a body of ignitable material for, when ignited, generating combustion products;

electrically energizable means for igniting said body of ignitable material, said electrically energizable means located in said body of ignitable material;

a base for supporting, on the inflator, said body of ignitable material and said means for igniting; and a cap sealed to said base, said cap enclosing said body of ignitable material and maintaining said body of ignitable material in position on said base;

at least a first portion of said cap being releasable as a unitary body from said base under the force of the combustion products of said body of ignitable material to enable movement of at least said first portion of said cap away from said base as a unitary body and into engagement with the burst disk, said first portion of said cap being adapted to rupture the burst disk, said first portion of said cap having an inner side surface which is in intimate contact with said body of ignitable material and an outer side surface which is engageable with said burst disk upon movement of said first portion of said cap into engagement with said burst disk, said body of ignitable material comprising an ignitable powder which is enclosed by said cap and maintained in position on said base by said cap, wherein a part of said first portion of said cap which is engageable with said burst disk has a spherical configuration engageable with said burst disk to create an opening in said burst disk.

2. An apparatus for inflating an inflatable vehicle occupant protection device, said apparatus comprising:

a container for containing a quantity of inflation fluid;

a burst disk blocking flow of fluid out of said container; and an actuatable initiator for rupturing said burst disk to enable flow of fluid out of said container, said initiator comprising:

a body of ignitable material for, when ignited, generating combustion products;

electrically energizable means for igniting said body of ignitable material, said electrically energizable means located in said body of ignitable material;

a base supporting said body of ignitable material and said means for igniting; and a cap supported on said base at a location spaced apart from said burst disk, said cap enclosing said body of ignitable material and maintaining said body of ignitable material in position on said base;

at least a first portion of said cap being releasable from said base as a unitary body under the force of the combustion products of said body of ignitable material to enable movement of at least said first portion of said cap away from said base as a unitary body and into engagement with said burst disk to rupture said burst disk, said first portion of said cap having an inner side surface which is in intimate contact with said body of ignitable material and an outer side surface which is engageable with said burst disk upon movement of said first portion of said cap into engagement with said burst disk, said body of ignitable material comprising an ignitable powder which is enclosed by said cap and maintained in position on said base by said cap.

3. An apparatus as set forth in claim 2 wherein said base comprises a metal header, said electrically energizable means for igniting said body of ignitable material comprising at least one electrical terminal connected with said base and a resistive element supported on said base in electrical contact with said electrical terminal, said body of ignitable material being enclosed by said cap and maintained by said cap in position on said base and in intimate contact with said resistive element.

4. An apparatus as set forth in claim 2 wherein said cap has a predetermined weakened portion which is rupturable under the force of the combustion products of said body of ignitable material to enable said first portion of said cap to be released from said base.

5. An apparatus as set forth in claim 2 wherein said first portion of said cap is rupturable away from said base under the force of the combustion products of said body of ignitable material.

\* \* \* \* \*